(12) United States Patent
Michigami et al.

(10) Patent No.: US 6,223,322 B1
(45) Date of Patent: Apr. 24, 2001

(54) METHOD AND APPARATUS FOR ENHANCING DATA RATE IN PROCESSING ECC PRODUCT-CODED DATA ARRAYS IN DVD STORAGE SUBSYSTEMS AND THE LIKE

(75) Inventors: Toru Michigami, Fujisawa; Keisuke Tanaka, Kawasaki, both of (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/238,354

(22) Filed: Jan. 27, 1999

(30) Foreign Application Priority Data

Jan. 28, 1998 (JP) .................................. 10-015740

(51) Int. Cl.$^7$ ............................. G11C 29/00; G06F 11/00
(52) U.S. Cl. .................................. 714/769; 714/701
(58) Field of Search ..................... 714/770, 701, 714/702, 769, 763, 768, 758, 756, 784, 723, 718, 52, 54, 48; 711/111, 112

(56) References Cited

U.S. PATENT DOCUMENTS 5,392,299 * 2/1995 Rhines et al. ..................... 714/756
5,751,730 * 5/1998 Mourot .................................. 714/755
5,942,005 * 8/1999 Hassner et al. ..................... 714/784
6,076,136 * 6/2000 Burroughs et al. .................. 711/5

OTHER PUBLICATIONS

Lin et al., "Error Control Coding: Fundamentals and Applications", Prentice–Hall, Inc., copyright 1983, pp. 274–278.

* cited by examiner

Primary Examiner—Christine T. Tu
(74) Attorney, Agent, or Firm—R. Bruce Brodie

(57) ABSTRACT

A method and apparatus for high-speed memory management of ECC product-coded data arrays read back from DVD storage subsystems in which rows of length $Y \leq 2^N \times (2m+1)$ of the array are read from disk and written in alternate blocks of $2^N$ bytes per block and $(2m+1)$ blocks per row into successive addresses of a synchronous dynamic random access memory (SDRAM) operable both as a buffer and an interleaved pair of memories. Array data is subjected to detection and correction of error and/or erasure by ECC processing of data extracted from and rewritten into the SDRAM, the array being extracted, ECC processed, and rewritten to and from the SDRAM in block interleave column major order and then in block interleave row major order.

17 Claims, 6 Drawing Sheets

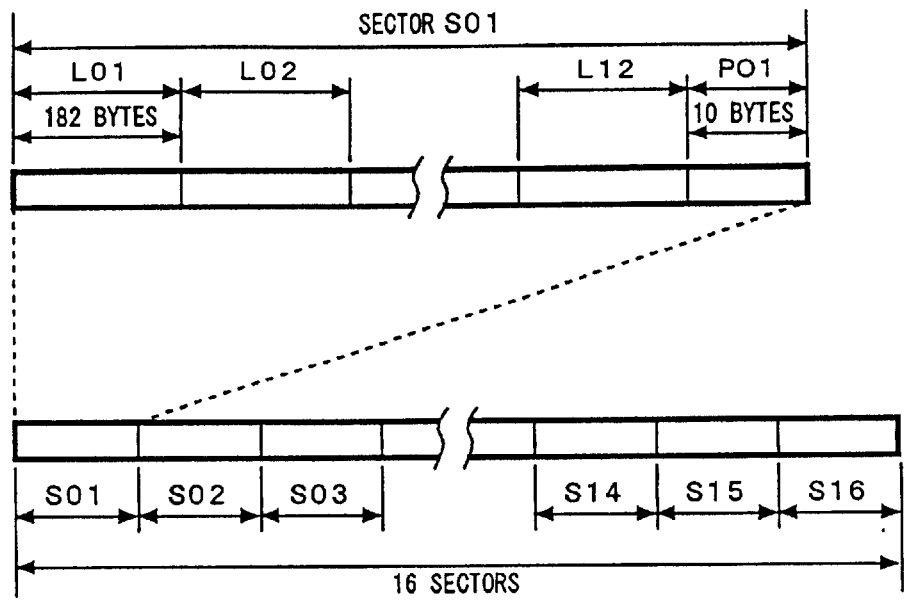
FIG. 2
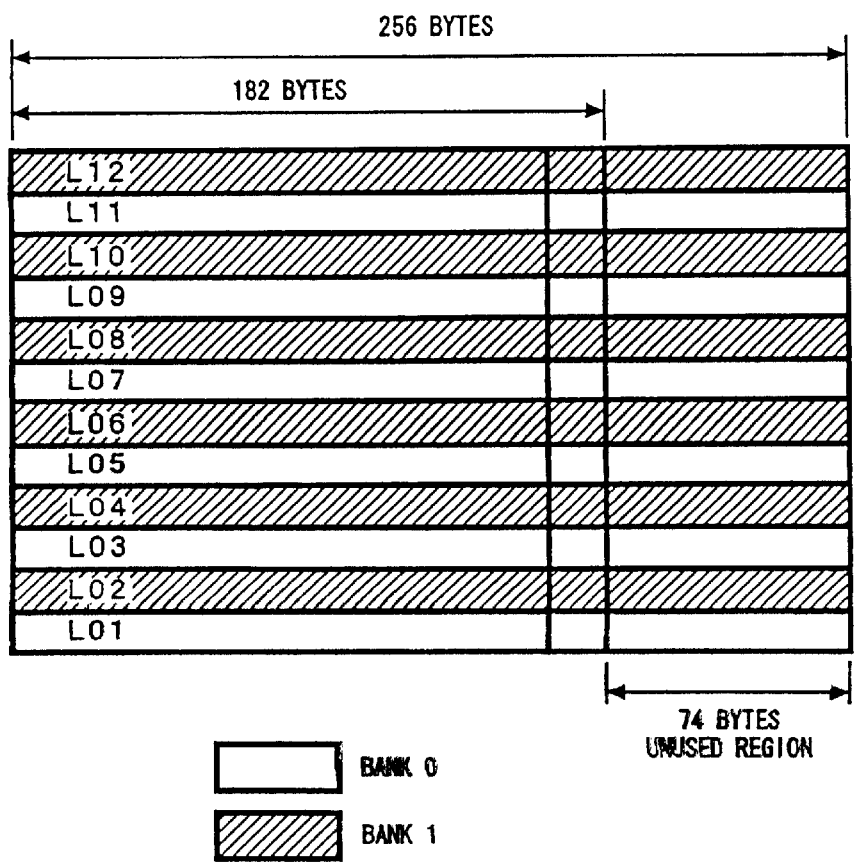
DATA MAPPING IN PRIOR ART    FIG. 3

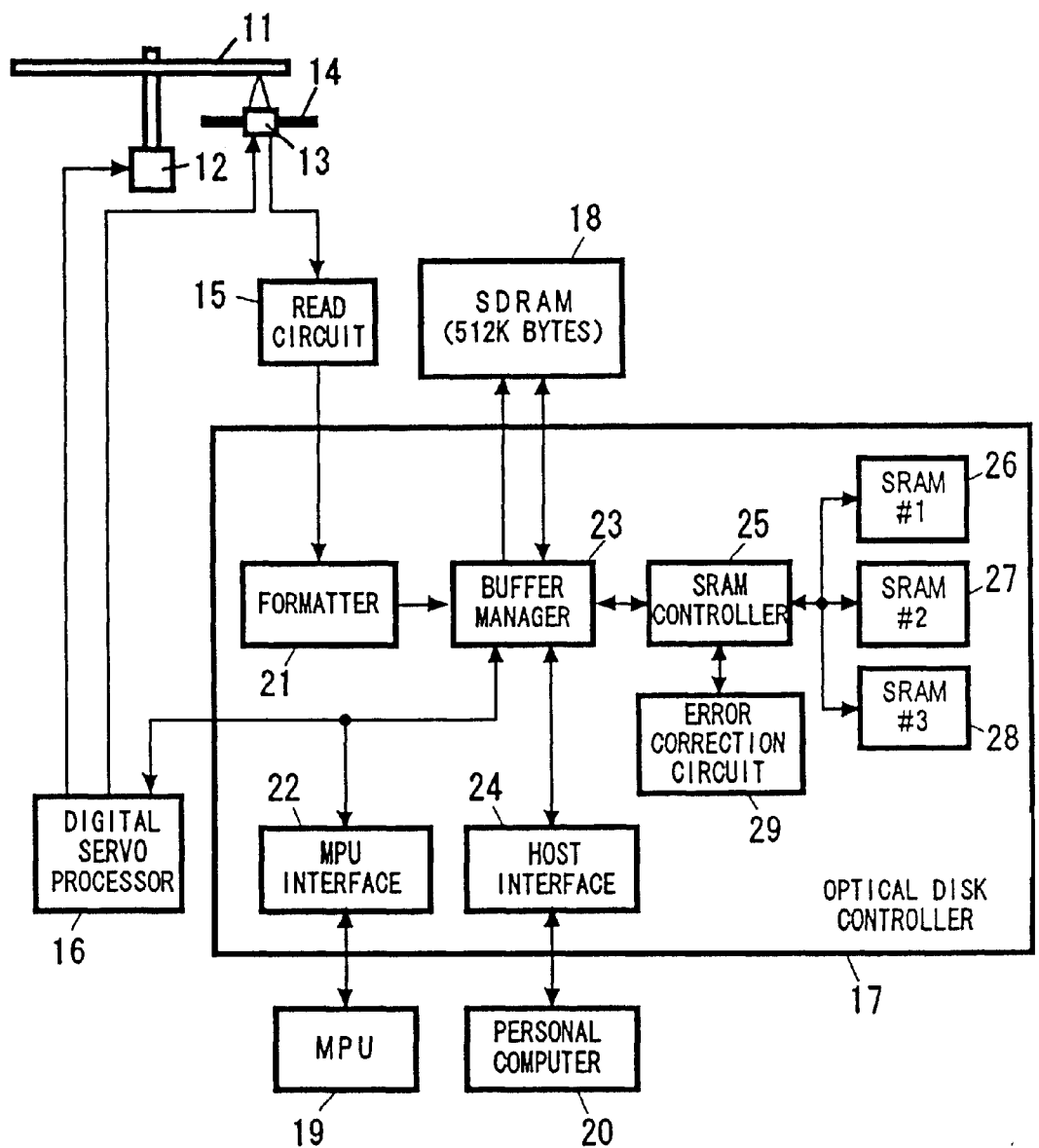
F I G. 4

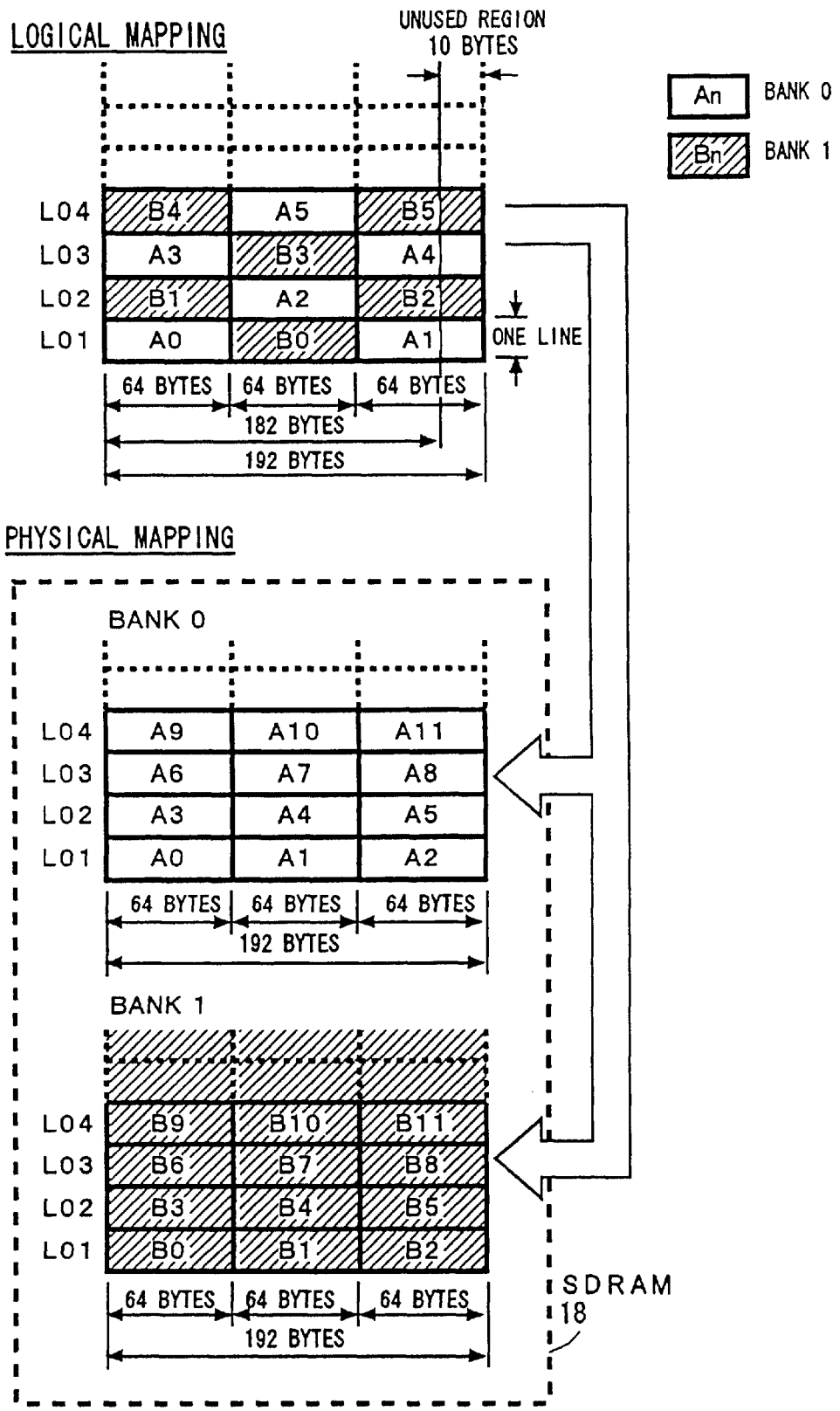
F I G. 5

METHOD AND APPARATUS FOR ENHANCING DATA RATE IN PROCESSING ECC PRODUCT-CODED DATA ARRAYS IN DVD STORAGE SUBSYSTEMS AND THE LIKE

FIELD OF THE INVENTION

This invention relates to methods and apparatus for processing product (rectangular) error correction-coded (ECC) data arrays, and more particularly to increasing the effective data rate as data is moved among memory and correction circuitry.

DESCRIPTION OF RELATED ART

In the prior art, digital versatile disk or alternatively digital videodisc (DVD) optical storage technology has received significant attention. In this regard, DVD is similar to that of a CD-ROM. However, it possesses a substantially greater storage capacity. Structurally, a DVD uses a single spiral track on a reflective metal surface packaged in plastic. The spiral track contains pits that are read by a drive laser as values of one or zero bits. DVD increases the data capacity of the disk by increasing the pit density and the number of tracks. As the pits become smaller and more densely packed, a smaller laser is required to read the disk. DVD uses a 635-nanometer laser compared with the 780-nanometer laser on the standard CD-ROM. Current laser support doubles the pits per track and double the tracks per surface area available on a CD-ROM. DVD further increases capacity by using a more efficient sector format. The base capacity of current DVD disks is 4.7 GB (single side/single layer), while the capacity of the CD-ROM use is in the order of 650 MB.

It is also well known in the prior art to use finite field, algebraic, block, or cyclic codes for detecting and correcting multiple bytes in error in long byte strings read back from a cyclic, concentric, tracked storage medium such as a magnetic disk storage subsystem or the like. Typically, each byte string of predetermined length is treated as if it were an algebraic polynomial and subject to modulo division by an encoding polynomial. If the code is denominated as being "systematic", then redundant bytes derived from the data are appended to the data string which otherwise remains intact. In the case of the linear block codes, the remainder is appended to the end of the data byte string. Each data byte string plus the appended remainder is then recorded on a storage medium or transmitted. Subsequently, when the data is accessed and played back from the medium, a remainder is in principle recalculated from the datastream as it is extracted and compared with the recorded remainder. If the remainder values comparison match, the difference result is zero. If the results do not match (nonzero difference), then this is indicative or error or erasure. The codes are quite advanced such that the remainders are processed not only for identifying the presence of error, but also for pinpointing its location and determining the correction values to be applied to the datastream. This is termed syndrome processing. Codes useful for error detection and correction are called "ECC" codes.

A Reed-Solomon (RS) code exemplifies linear cyclic ECC codes used extensively in magnetic recording and communications. One advantage of RS codes is that they maintain maximum distance among codewords for any given length of data. This "spacing" between permissible codewords renders them useful for detecting and correcting randomly occurring byte errors as well as burst errors over a run of contiguous bytes. Reference should be made to copending application Ser. No. 08/838,375, now is U.S. Pat. No. 5,942,005 "Method and Means for Computationally Efficient Error and Erasure Correction in Linear Cyclic Codes", filed Apr. 8, 1997, for a detailed description of a high-performance ECC detection and correction method and apparatus embedded in the recording channel path of a magnetic disk storage subsystem.

The RS code among other ECC codes is one dimensional in that it is defined over a data byte string of predetermined length. Such encoding is adequate for one dimensional data recording or transmission such as is found on concentric tracked magnetic disk storage. However, optical recorded images are recorded as data arrays. In this mode, so-called product or rectangular codes suitable for protecting data arrays have been extant for some time.

A product-coded data array as defined in Lin et al., "Error Control Coding: Fundamentals and Applications", *Prentice-Hall, Inc.*, copyright 1983, at pp. 274–278, comprises a data array or rectangle of data bytes in which $K_1$, rows and $K_2$ columns formed. Then, a horizontal ECC code of PI bytes is appended to each row and a vertical ECC code of PO bytes is appended to each column. This results in an array of dimensions $(K_1+PI) \times (K_2+PO)$. The rate (k/n) of the rectangular code is:

$$k/n = (K_1 \times K_2)/(K+PI)(K_2+PO).$$

When the data is read from any storage system, the data bytes are subject to error and erasure from random, intermittent, recurrent sources. These may be due to media defects, signal coupling between tracks, extraneous signals induced in the readback path, etc. In the case of a one-dimensional data array such as a row vector, error patterns may occur as random bytes in error or clustered together as a run of contiguous bytes in error. One related consequence is the fact that as the number of errors in any given row increase, then the likelihood of miscorrection by the ECC decoder increases. As Lin et al. point out at page 275, in a product-coded, two-dimensional array, one process of error detection and correction involves first error decoding the rows and then error decoding the columns. If the density of errors is relatively low, then row correction might be sufficient. However, if the density in some portions of some rows is high, then row error decoding might result in the old errors being cured and new errors being created.

It is generally desired to correct the errors in place. This means that an array is read from the medium and written into a sufficiently sized buffer or RAM and local to the storage subsystem. One processing problem is that the local buffer or RAM must be repeatedly referenced in the column as well as row directions, the data extracted and moved through the ECC processor, and the corrected data returned to the local buffer or RAM. This substantially increases both decoding time and complexity in the processing of errors and erasures.

SUMMARY OF THE INVENTION

It is an object of this invention to devise a method and apparatus for enhancing the transfer data rate among logical and memory elements processing errors and erasures in product-coded data arrays.

It is a related object to devise a method and apparatus for enhancing the transfer data rate among logical and memory elements processing errors and erasures in systematic ECC product-coded data arrays as used in DVD or other optically readable data recording subsystems.

It is yet another object that such method and apparatus efficiently effectuate an enhanced transfer data rate such that corrected data may be written back in place in the ECC product-coded data array as imaged from a storage or communications source into a buffer or RAM local to said storage or communications source.

It is still another object that such method and apparatus use an improved memory interleave arrangement for mapping the coded data into the local or working memory, increasing use efficiency without decreasing access speed of the local or working memory.

The above objects are believed satisfied by a machine-implementable method for enhancing the data transfer rate in an arrangement formed by an ECC processor coupling a local memory. The arrangement detects and corrects errors and erasures responsive to a source of error correction-coded (ECC) product data arrays. Each product-coded array has a first predetermined number of rows of Y bytes per row and a second predetermined number of columns. The arrangement writes each data array into the local memory, transfers data from the array in the local memory to the ECC processor, transfers corrected data from the ECC processor, and writes the transferred corrected data back into the local memory.

The method of the invention transfers each row of the data array from the source in row major order in blocks of $2^N$ bytes per block and (2m+1) blocks per row. It then writes consecutive blocks ($1^{st}$ row—$A_0$, $B_0$, $A_1$; $2^{nd}$ row—$B_1$, $A_2$, $B_2$, . . . ) into successive alternate addresses ($A_0$, $A_1$, $A_2$; $B_0$, $B_1$, $B_2$) in a pair of independently accessible linear address spaces in the local memory operated in an interleaved manner. In this regard, N and m are positive integer parameters satisfying the constraint $Y \leq 2^N \times (2m+1)$. The next step is that of extracting data, ECC correcting the extracted data, and rewriting corrected data to and from successive addresses in the linear address spaces in the first memory. Significantly, the pattern of extraction and rewriting in the local memory is that of block interleave array row major order and then in block interleave array column major order.

In DVD and systems using product-coded data, each data array has a row direction and a column direction. Also, each array is encoded in a first linear systematic ECC selected from a set consisting of a block ECC and a cyclic ECC. The first ECC is defined over the array in the row direction. Likewise, each array is also encoded in a second linear systematic ECC also selected from a set consisting of a block ECC and a cyclic ECC. The second ECC is defined over the array in the column direction. This means that each data array comprises $K_1 \times K_2$ symbols formed from $K_1$ rows of ($K_2$–PI) data symbols and PI redundant symbols per row, and $K_2$ columns of ($K_1$–PO) data symbols and PO redundant symbols per column, the PI redundant symbols per row being derived from the row data symbols according to the first ECC, the PO redundant symbols per column being derived from the column data symbols according to the second ECC.

In the method of this invention, the local memory comprises a synchronous dynamic random access memory (SDRAM) logically partitioned to form the pair of linear address spaces. The extraction of array data from the SDRAM address spaces ($A_0$, $A_1$, $A_2$; $B_0$, $B_1$, $B_2$) in the SDRAM occurs in block interleave array row major order. It includes extracting the blocks in successive addresses in the linear spaces in an alternate and interleaved pattern ($1^{st}$ row—$A_0$, $B_0$, $A_1$; $2^{nd}$ row—$B_1$, $A_2$, $B_2$, . . . ). Also, the extraction of array data from the linear address spaces ($A_0 A_3$ $A_6$ $A_9$; $B_1 B_4 B_7 B_{10}$) in the SDRAM in block interleave array column major order includes extracting the blocks in successive addresses in the linear spaces in an alternate and interleaved offset pattern ($1^{st}$ col.—$A_0 B_1 A_3 B_4$; $2^{nd}$ col.—$B_0 A_2 B_3 A_5$, . . . ).

Since each array row of length Y bytes includes 2 m+1 blocks of $2^N$ bytes per block is subject to the constraint $Y \leq 2^N \times (2m+1)$, then use efficiency varies according to the selection of the parameters (N, m). In order to maintain the use efficiency in the range between 80% to 100% and Y being set equal to a nominal 182 bytes, then an ordered pair (N, m) of integer parameters is one selected from a set consisting of {(3, 11), (3, 12), (4, 6), (5, 3), (6, 1)}.

As a consequence of these measures, the local memory can be operated in an interleaved and pipelined manner for moving the elements of each data array out for ECC correction and then back into the local memory once corrected.

BRIEF DESCRIPTION OF THE DRAWING

FIG. 2 depicts an array of ECC-coded data recorded on a sector-organized recording disk.

FIG. 3 illustrates the storage packing inefficiency of a prior data mapping method for storing the ECC-coded data in memory banks.

FIG. 4 sets forth a DVD storage subsystem incorporating the method and apparatus of this invention.

FIG. 5 shows a logical mapping of ECC block 1 shown in FIG. 1 and a real or physical mapping scheme for mapping the ECC-coded data read from the DVD into two memory banks, in accordance with the present invention.

DESCRIPTION OF THE PREFERRED EMBODIMENT

Figure 1:
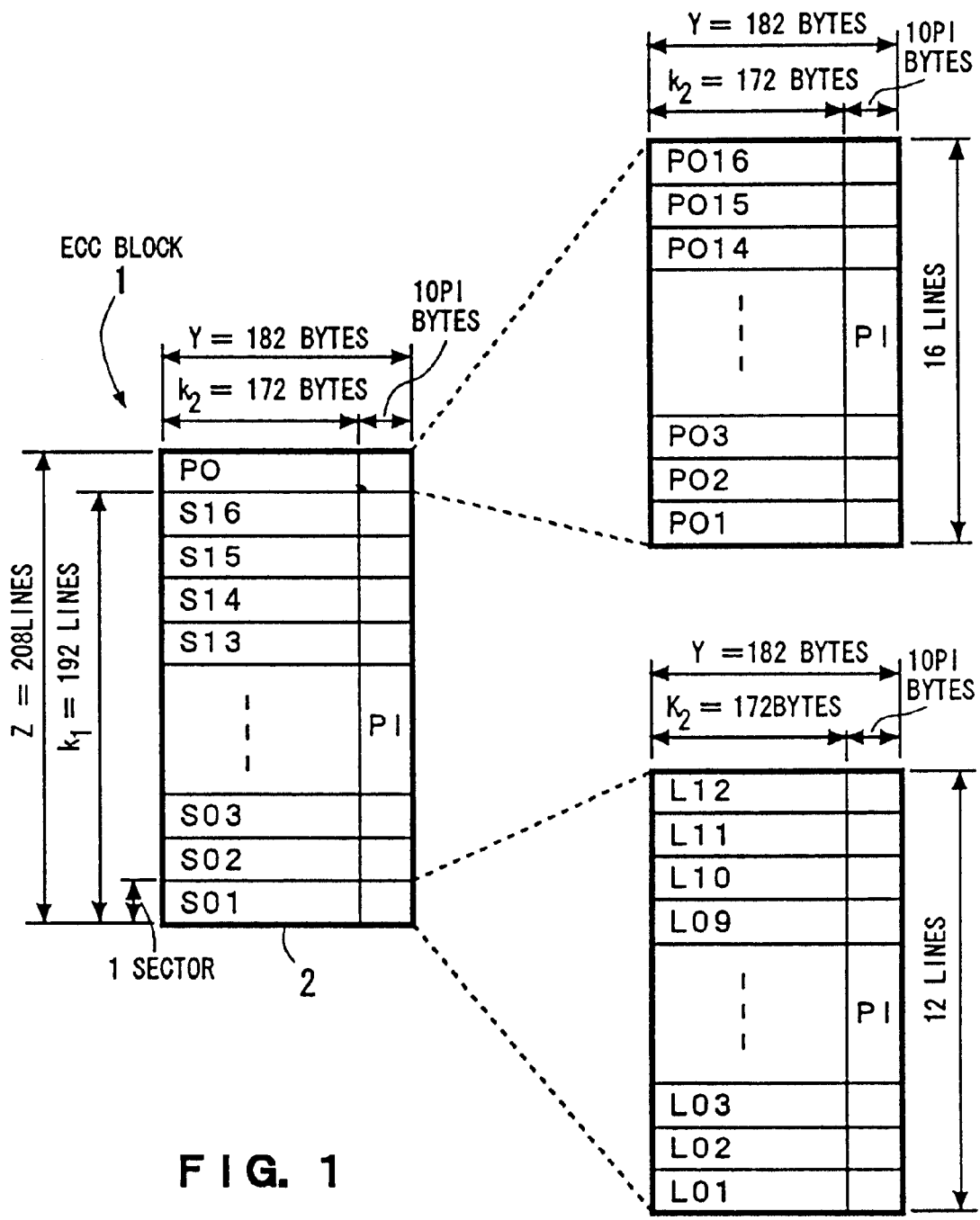
FIG. 1 shows a dimensioned array of a product-coded data.

Referring now to FIG. 1, there is shown a DVD used as a ROM (read-only memory) or RAM (random access memory). In the DVD-ROM/RAM, an error correction based upon the product code scheme is performed when the data is read from the DVD, and in the DVD-RAM, a generation of error correction codes is performed when the data is newly written into the DVD. The use of the product code scheme is defined by a standard of the DVD. Describing the product code scheme briefly with reference to FIG. 1, data is arranged in an array of $k_1 \times k_2$, and an error correction code, i.e., PO (parity-outer code) is added to the $k_1$ data in each column of a vertical direction, and an error correction code, i.e., PI (parity-inner code) is added to the $k_2$ data in each row of a horizontal direction. A group including the data and the error correction code PO or PI is called ECC-coded data. The $k_1$ data and the PO are fetched to perform the error correction of the $k_1$ data in each column, and the $k_2$ data and the PI are fetched to perform the error correction of the $k_2$ data in each row. In accordance with the standard of the DVD, a length Y of the ECC-coded data of one line in the row direction is defined to 182 bytes which include 172 data bytes and 10 PI bytes. The Y×Z coded data is called an ECC block 1. The value of a length Z is determined by the number of sectors on the DVD. The exemplary case of the ECC block 1 contains 16 sectors S01–S16, and each sector contains 12 coded data lines. Each of the coded data lines L01–L12 contains 172 data bytes and 10 PI bytes.

Referring now to FIG. 2, there is shown the ECC-coded data recorded in a data recording track of the DVD. The 16 PO lines are distributed into 16 sectors, respectively. For example, sector S01 contains coded data lines L01–L12 and the 10 PO bytes of one PO line (PO1). The ECC-coded data of sectors S01–S16 are sequentially read from the DVD and stored in the working memory 2, i.e., DRAM (dynamic random access memory), to assemble the ECC block 1 shown in FIG. 1. To perform the error correction, the ECC block stored in the DVD is read and buffered in a working memory. When new data of $k_1 \times k_2$ is written in the DVD, the data is mapped or buffered into the working memory and new error correction codes PO and PI are generated and added to complete the ECC block shown in FIG. 1. It is noted that the description in the present specification is directed to the error correction of the coded data read from the DVD, and the memory for storing or buffering the coded data read from the DVD is called the working memory.

An error correction circuit or ECC processor accesses the working memory to read the data and the PO arranged in the column direction to perform the error correction of the data in the column direction. The ECC processor also reads the data and the PI arranged in the row direction to perform the error correction of the data in the row direction.

It is assumed that the addresses in the row direction in the working memory are continuously assigned, and the addresses in the column direction are discontinuously assigned. In this case, the read operation in the row direction can be made at a relatively high speed, but the read operation in the column direction is made at a low speed due to a discontinuity of the addresses in the column direction, whereby the access speed of the working memory, i.e., the DRAM, has been decreased. To solve such a problem, a scheme called a bank interleave as shown in FIG. 3 has been used.

Referring now to FIG. 3, there is shown memory space for storing only coded data in the coded data lines L01–L12 of sector S01 shown in FIG. 1. Two DRAM chips constituting a memory bank 0 and a memory bank 1 are used as the working memory into which the ECC-coded data read from the data recording tracks of the DVD are stored. The coded data of odd-numbered coded data lines are stored in the bank 0, the coded data of even -numbered coded data lines are stored in the bank 1, and the access operation to the banks 0 and 1 is made in the interleave scheme well known in the art whereby, in appearance, a RAS-CAS delay time and a precharge time of the DRAMs, i.e., the banks 0 and 1, are hidden and the access time in the column direction seems to be high.

In the prior art, memory bank interleaving of product-coded array data required that the length of the coded data in the row direction be selected to a length represented by $2^N$. Also, the length of the coded data in the row direction is limited to 182 bytes by the DVD standard. However, in the prior art, the memory banks 0 and 1 having 256 bytes in the row direction have usually been used. In this case, only 182 bytes are used among 256 bytes in the row direction, and the remaining 74 bytes are not used so that a use efficiency in the row direction becomes a low value, i.e., 71%=182 bytes/256 bytes.

Referring now to FIG. 4, there is shown a DVD system to which the present invention is incorporated. The ECC-coded data including the data and the error correction code are stored in a DVD or a data recording disk 11. It is noted that the ECC-coded data is called coded data, and the error correction of the data of the ECC-coded data is called an error correction of the coded data hereinafter. A spindle motor 12 rotates the DVD 11. A read head 13 moving on a guide bar 14 reads the coded data and servo information on the DVD 11 and supplies it to a read circuit 15. The read circuit 15 supplies the coded data and the servo information to a formatter 21 in an optical disk controller 17. One-byte data is represented by 16 pits on the DVD. The formatter 21 converts the data of the 16 pits to one-byte data based upon a conversion scheme called EFM plus decode, well known in the art. The formatter 21 partitions the coded data into the 182 byte length of one row by detecting a 32-bit synchronous pattern indicating a top of data and sends the 182 bytes to a buffer manager 23.

In the embodiment of FIG. 4, the digital servo processor 16 controls the spindle motor 12 and the read head 13 based on control information supplied from the optical disk controller 17. An SDRAM (synchronous DRAM) of 512K bytes is connected to the optical disk controller 17 and is used as the working memory for storing the coded data read from the DVD 11. MPU 19 is connected to an MPU interface 22 for controlling the read operation of the DVD memory system. The data corrected by the optical disk processor 17 based upon the product code scheme is sent to a personal computer 20 through a host interface 24.

The present invention corrects the error of the data arranged in the row direction and the column direction based on the product code scheme by using the PO (parity-outer code) and the PI (parity-inner code), wherein the PO is used for correcting the error of the data in the column direction. PI is used for correcting the error of the data in the row direction as stated with reference to FIG. 1.

The method and apparatus of the present invention uses two memory banks 0 and 1 as the local or working memory for storing the coded data read from the DVD 11. The SDRAM 18 shown in FIG. 4 is used as the banks 0 and 1. The banks 0 and 1 are accessed in the manner of the bank interleave. The present invention uses a mapping scheme shown in FIG. 5 for improving the use efficiency of the working memory without decreasing the access speed of the working memory and without requiring an additional peripheral circuit. FIG. 5 shows a logical mapping of the ECC block shown in FIG. 1 and a physical mapping scheme for mapping the coded data read from the DVD 11 into two memory banks 0 and 1 of the SDRAM 18. The 182-byte length shown in FIG. 5 corresponds to the 182-byte length shown in FIGS. 1 and 2, and the coded data lines L01–L04 shown in FIG. 5 correspond to the coded data lines L01–L04 of sector S01 shown in FIGS. 1 and 2. For simplifying the description, only the coded data lines L01–L04 are shown in FIG. 5.

The present invention uses the two banks 0 and 1, and each of the banks 0 and 1 is divided into odd blocks, each of which has the same length in the row direction. The total length in the row direction of the banks 0 and 1 and the length of each block are decided by the constraint $Y \leq 2^N \times (2m+1)$.

In this constraint, Y is the length of the coded data in one coded data line, i.e., the number of bytes (182 bytes), and the n and the m are positive integers, respectively. The total length, i.e., the total number of bytes, in the row direction of the banks 0 and 1 is represented by $[2^n \times (2m+1)]$, and the length, i.e., the total number of bytes, in the row direction of one block is represented by $(2^n)$, and the number of blocks is represented by $(2m+1)$. Since the minimum length of block is selected to eight bytes for utilizing the merit of the bank interleave scheme of the synchronous DRAM, as described with reference to FIGS. 6 and 7, the number "n" equal to or lager than the number "3" is used. Various combinations of the number "n" and the number "m" can be selected to improve the use efficiency of 71% of the prior arrangement shown in FIG. 3. It is preferable to use the following combinations of the number "n" and the number "m" to provide a use efficiency higher than 80%.

| Case | $Y \leq 2^N \times (2m + 1)$ | (N, m) | Use Efficiency |
|------|------------------------------|--------|----------------|
| 1 | $182 \leq 8 \times 23$ | (N = 3, m = 11) | 182/184 = 98.9% |
| 2 | $182 \leq 8 \times 25$ | (N = 3, m − 12) | 182/200 = 91.0% |
| 3 | $182 \leq 16 \times 13$ | (N = 4, m = 6) | 182/208 = 87.5% |
| 4 | $182 \leq 32 \times 7$ | (N = 5, m = 3) | 182/224 = 81.25% |
| 5 | $182 \leq 64 \times 3$ | (N = 6, m = 1) | 182/192 = 94.79% |

Values of N and m Upon Use Efficiency

Figure 6:
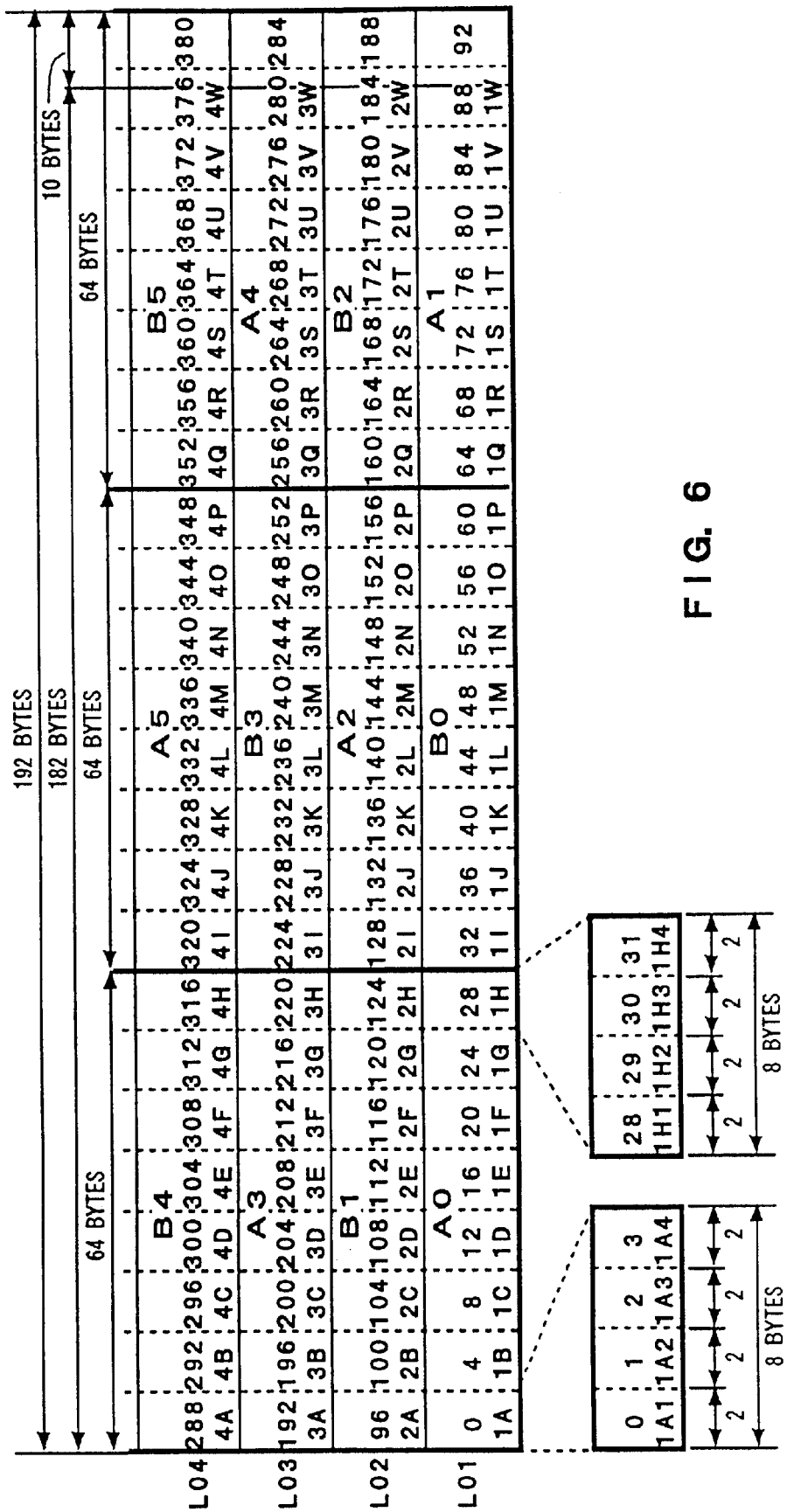
FIG. 6 depicts detailed logical mapping of the ECC-coded data shown in FIG. 5 in accordance with the present invention.
Figure 7:
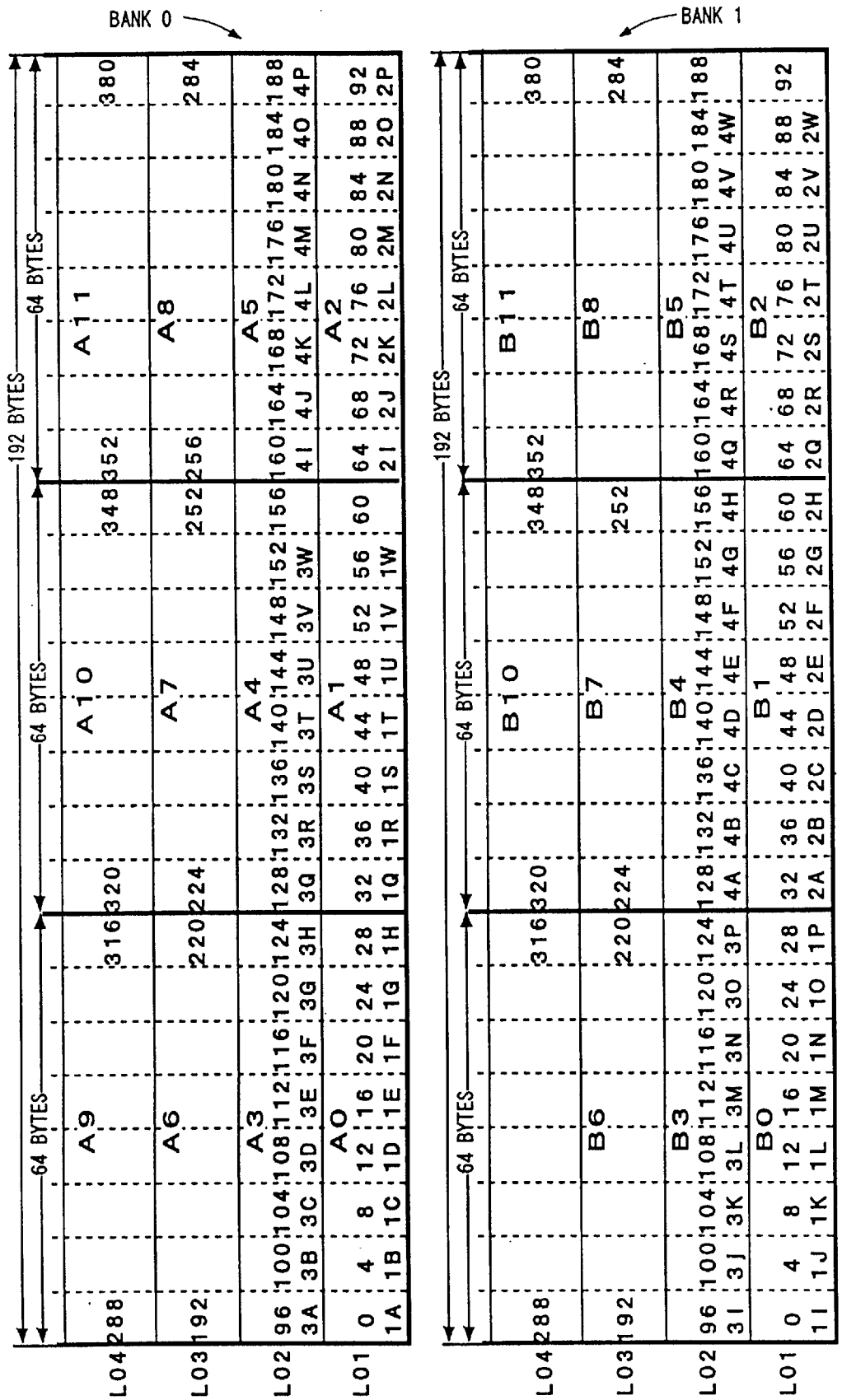
FIG. 7 illustrates the physical mapping of the ECC-coded data read from the DVD into two memory banks, in accordance with the present invention.

Referring now to FIGS. 5, 6, and 7, there is shown the embodiment using case 5. In this embodiment, the total row length in the row direction of each of the banks 0 and 1 is 192 bytes, the number of blocks in each bank 0 and 1 is "3", and the length of each of the three blocks is 64 bytes. The detail of the logical mapping shown in FIG. 5 is shown in FIG. 6, and the detail of the physical mapping in banks 0 and 1 shown in FIG. 5 is shown in FIG. 7. The buffer manager 23 of the optical disk controller 17 controls the write operation of the coded data into the SDRAM 18, i.e., the memory banks 0 and 1, and the read operation of the coded data from the SDRAM 18.

The logical mapping in FIG. 5 indicates that the coded data lines L01–L04 are divided into three blocks, each of which contains 64 bytes, and under the control of the buffer manager 23 of the optical disk controller 17, the first block of the coded data line L01 is stored in the block A0 of the memory bank 0, the second block of the coded data red in the block B0 in the memory bank 1, the third block of the coded data line L01 is stored in the block A1 of the memory bank 0, the first block of the coded data line L02 is stored in the block B1 of the bank 1, the second block of the coded data line L02 is stored in the block A2 of the bank 0, the third block of the coded data line L02 is stored in the block B2 of the bank 1, and so on. The error correction of the coded data line L01 is made by alternately fetching the block A0 of the bank 0, the block B0 of the bank 1, and the block A1 of the bank 0.

The error correction in the column direction is made by alternately fetching the block A0, the block B1, the block A3, the block B4, and so on. More particularly, the 64-byte block is divided into eight data access units, each of which has an 8-byte length, as shown in FIGS. 6 and 7. The 8-byte length of the data access unit is selected for the following reason. In the error correction in the column direction, portions of each of the sectors S01–S16 and the PO shown in FIG. 1 are sequentially fetched by the buffer manager 23 in the bank interleave scheme. These portions, i.e., the data access units 1A, 2A, 3A, 4A, . . . of the coded data lines of the sectors S01–S16 and the PO are sequentially fetched by the buffer manager 23.

It is noted that only the data access units 1A–4A are shown in FIGS. 5 and 6, and such data access units of the remaining sectors and the PO are fetched to perform the error correction of the coded data in the column direction. To cause the access time in appearance of the banks 0 and 1 for fetching the data access units 1A, 2A, 3A, 4A, . . . to be short, it is required to read one data access unit by four times of access operation so that the length represented by 2 bytes_4=8 bytes, as shown in FIG. 6, is used as the length of one data access unit.

Store Operation of the Coded Data

As stated before, the coded data and the PO of each of the sectors S01–S16 stored in the DVD 11 are sequentially read by the read head 13 and stored in the banks 0 and 1, i.e., the working memory, under the control of the buffer manager 23 of the optical disk controller 17. The first block containing the data access units 1A–1H of the coded data line L01 is stored in the real address 0–28 of the block A0 of the bank 0, the second block containing the data access units 1I–1P of the coded data line L01 is stored in the real address 0–28 of the block B0 of the bank 1, and the third block containing the data access unit 1Q–1W is stored in the real address 32–60 of the block A1 of the bank 0, and so on as shown in FIGS. 6 and 7 and the following Table 1.

TABLE 1

| Line | Block No. | Memory Bank | Real Address in the Memory Bank |
|------|-----------|-------------|-------------------------------|
| L01 | 1 | 0 | 0–28 |
|  | 2 | 1 | 0–28 |
|  | 3 | 0 | 32–60 |
| L02 | 1 | 1 | 32–60 |
|  | 2 | 0 | 64–92 |
|  | 3 | 1 | 64–92 |
| L03 | 1 | 0 | 96–124 |
|  | 2 | 1 | 96–124 |
|  | 3 | 0 | 128–156 |
| L04 | 1 | 1 | 128–156 |
|  | 2 | 0 | 160–188 |
|  | 3 | 1 | 160–188 |

In this manner, the two banks 0 and 1 have been assigned with the same real addresses, as shown in FIG. 7, and are divided into odd blocks, for example, three blocks, respectively, and the blocks of each of the two banks, for example, the blocks $A_0$, $A_1$, $A_2$, . . . and blocks $B_0$, $B_1$, $B_2$, . . ., are serially arranged in each bank. Therefore, the coded data of each coded data line which is read from the DVD 11 is divided into the three blocks, and these successive blocks of the coded data of a plurality of coded data lines are alternately stored in the two banks 0 and 1 one by one wherein the successive blocks of the coded data of the coded data lines assigned to the bank 0, such as the #1 block of the coded data line L01, the #3 block of the coded data line L01, the #2 block of the coded data line L02, . . ., are stored in the successive blocks arranged in the order of the real addresses of the bank 0, i.e., the blocks A0, A1, A2, . . ., of the bank 0, respectively, and the successive blocks of the coded data assigned to the bank 1, such as the #2 block of the line L01, the #1 block of the coded data line L02, the #3 block of the coded data line L02, . . ., are stored into the successive blocks arranged in the order of the real addresses of the bank 1, i.e., the blocks B0, B1, B2, . . ., of the bank 1, respectively.

The following Table 2 shows the logical addresses treated by the buffer manager 23 of the optical disk controller 17, and the real addresses of the SDRAM 18 constituting the banks 0 and 1, respectively. Since the banks 0 and 1, each of which has 512K byte capacity, are used, address lines A1–A18 are used to access the bank 0 or 1.

TABLE 2

| Logical Addresses | 0 | 31 | 32 | 63 | 64 | 95 | 96 | 192 | 288 |
|---|---|---|---|---|---|---|---|---|---|
| A18 = 262144 | 0 | 0 | 0 | 0 | 0 | 0 | 0 | 0 | 0 |
| A8 = 256 | 0 | 0 | 0 | 0 | 0 | 0 | 0 | 0 | 1 |
| A7 = 128 | 0 | 0 | 0 | 0 | 0 | 0 | 0 | 1 | 0 |
| A6 = 64 | 0 | 0 | 0 | 0 | 1 | 1 | 1 | 1 | 0 |
| BANK SEL = 32 | 0 | 0 | 1 | 1 | 0 | 0 | 1 | 0 | 1 |
| A5 = 16 | 0 | 1 | 0 | 1 | 0 | 1 | 0 | 0 | 0 |
| A4 = 8 | 0 | 1 | 0 | 1 | 0 | 1 | 0 | 0 | 0 |
| A3 = 4 | 0 | 1 | 0 | 1 | 0 | 1 | 0 | 0 | 0 |
| A2 = 2 | 0 | 1 | 0 | 1 | 0 | 1 | 0 | 0 | 0 |
| A1 = 1 | 0 | 1 | 0 | 1 | 0 | 1 | 0 | 0 | 0 |
|  | *** | *** | *** | *** | *** | *** | *** | *** | *** |
| Real Addresses | 0 | 31 | 0 | 31 | 32 | 63 | 32 | 96 | 128 |
| BANK | 0 | 0 | 1 | 1 | 0 | 0 | 1 | 0 | 1 |
| A18 = 262144 | 0 | 0 | 0 | 0 | 0 | 0 | 0 | 0 | 0 |
| A8 = 128 | 0 | 0 | 0 | 0 | 0 | 0 | 0 | 0 | 1 |
| A7 = 64 | 0 | 0 | 0 | 0 | 0 | 0 | 0 | 1 | 0 |
| A6 = 32 | 0 | 0 | 0 | 0 | 1 | 1 | 1 | 1 | 0 |
| A5 = 16 | 0 | 1 | 0 | 1 | 0 | 1 | 0 | 0 | 0 |
| A4 = 8 | 0 | 1 | 0 | 1 | 0 | 1 | 0 | 0 | 0 |
| A3 = 4 | 0 | 1 | 0 | 1 | 0 | 1 | 0 | 0 | 0 |
| A2 = 2 | 0 | 1 | 0 | 1 | 0 | 1 | 0 | 0 | 0 |
| A1 = 1 | 0 | 1 | 0 | 1 | 0 | 1 | 0 | 0 | 0 |

Describing the relationship between the logical addresses handled by the buffer manager 23 and the real addresses of the banks 0 and 1, the logical address 0 corresponds to the real address 0 of the bank 0, the logical address 31 corresponds to the real address 31 of the bank 0, the logical address 32 corresponds to the real address 0 of the bank 1, the logical address 63 corresponds to the real address 31 of the bank 1, the logical address 64 corresponds to the real address 32 of the bank 0, the logical address 95 corresponds to the real address 63 of the bank 0, the logical address 96 corresponds to the real address 32 of the bank 1, the logical address 192 corresponds to the real address 96 of the bank 0, and the logical address 288 corresponds to the real address 128 of the bank 1. The conversion from the real address to the logical address is performed by inserting the bits indicating the bank as BANK SEL bits between the bit A5 and bit A6, as apparent from Table 2.

Read and Error Correction Operation of the Coded Data

The coded data stored in the banks 0 and 1 are alternately read in the bank interleave scheme to correct the error of the coded data in the column direction and the row direction, under the control of the buffer manager 23 of the optical disk controller 17.

Read and Error Correction Operation of the Coded Data in the Column Direction

In the error correction in the column direction, the data access units of each of the sectors S01–S16 and the PO shown in FIG. 1 arranged in the column direction are sequentially fetched by the buffer manager 23 in the bank interleave scheme, as described before. It is assumed that an error correction circuit 29 of the optical disk controller 17 performs the error correction of the coded data of the first column including the data access units 1A, 2A, 3A, 4A, . . . of the coded data lines of the sectors S01–S16 and the PO. The relationship between the logical addresses of the data address units 1A, 2A, 3A, 4A, . . . and the real addresses of the banks are as follows:

TABLE 3

| Data Access Units | Logical Address | Real Address | Memory Bank |
|---|---|---|---|
| 1A | 0 | 0 | 0 |
| 2A | 96 | 32 | 1 |
| 3A | 192 | 96 | 0 |
| 4A | 288 | 128 | 1 |

It is apparent that the logical addresses are obtained by successively adding the value "96" to the logical address of the first data access unit 1A so that the addressing operation of the banks 0 and 1 in the column direction can be simplified, and the address conversion from the logical address to the real address can be made in the buffer manager 23 without requiring an additional peripheral circuit. The buffer manager 23 performs the read operation of the data access units of the coded data of the first column by alternately accessing the banks 0 and 1 in the bank interleave scheme in the sequence shown in Table 3. In this manner, the coded data of the first column including the data access units 1A, 2A, 3A, 4A, . . . of the coded data lines of the sectors S01–S16 and the PO are alternately read from the banks 0 and 1 and are stored in the first SRAM 26 through the SRAM controller 25. The three SRAMs 26, 27, and 28 operate in a pipeline scheme, as below.

In a first cycle, the coded data of the first column including the data access units 1A, 2A, 3A, 4A, . . . are fetched from the banks 0 and 1 and are stored and assembled in the first SRAM 26. In a second cycle, the coded data of the first column in the SRAM 26 are sent to the error correction circuit 29 through the SRAM controller 25 and the error(s) of the data of the first column are corrected, and the coded data in the second column including the data access units 1B, 2B, 3B, 4B, . . . are fetched from the banks 0 and 1 and are stored and assembled in the second SRAM 27.

In a third cycle, the corrected coded data of the first column are fed back to the first SRAM 26 from the error correction circuit 29 to update the original data in the SRAM 26, the coded data of the second column in the SRAM 27 are sent to the error correction circuit 29 through the SRAM controller 25 and the error(s) of the data of the second column are corrected, and the coded data of the third column including the data access units 1C, 2C, 3C, 4C . . . are fetched from the banks 0 and 1 and are assembled in the third SRAM 28.

In a fourth cycle, the corrected coded data of the first column in the first SRAM 26 are rewritten to the banks 0 and 1 through the SRAM controller 25 and the buffer manager 23 so that the error(s) of the data of the first column are corrected, the corrected coded data of the second column are fed back to the second SRAM 27 from the error correction circuit 29 to update the original data in the SRAM 27, and the coded data of the third column in the SRAM 28 are sent to the error correction circuit 29 through the SRAM controller 25 and the error(s) of the data of the third column are corrected.

In a fifth cycle, the coded data of the fourth column including the data access units 1D, 2D, 3D, 4D, . . . are fetched from the banks 0 and 1 and are stored and assembled in the first SRAM 26, the corrected coded data of the second column in the second SRAM 27 are rewritten to the banks 0 and 1 through the SRAM controller 25 and the buffer manager 23 so that the error(s) of the data of the second column are corrected, and the corrected coded data of the third column are fed back to the third SRAM 28 from the error correction circuit 29 to update the original data so that the error(s) of the data of the third column are corrected. In this manner, the error correction in the column direction is continuously performed until the error correction of the coded data of the last column including the data access units 1W, 2W, 3W, 4W, . . . has been completed.

It is noted that each of the data access units 1W, 2W, 3W, 4W, . . . of the last column contains only six bytes, and only six bytes are sent to the SRAM 26 under the control of the buffer manager 23. More particularly, the buffer manager 23 contains a counter which counts the number of bytes of the coded data read from the banks 0 and 1 so that only six bytes of the data access unit of the last column are sent to the first SRAM 26.

Read and Error Correction Operation of the Coded Data in the Row Direction

In the error correction in the row direction which corrects the errors of the coded data of each coded data line L01, L02, L03, L04, . . ., the buffer manager 23 sequentially reads each coded data line from the bank 0 and 1 by using the real addresses shown in Table 1, and the error correction of each coded data line is made in the pipeline scheme. More particularly, in a first cycle, the coded data of the first coded data line L01 is fetched from the banks 0 and 1 and is stored and assembled in the first SRAM 26.

In a second cycle, the coded data of the first coded data line L01 in the SRAM 26 is sent to the error correction circuit 29 through the SRAM controller 25 and the error(s) of the data of the first coded data line L01 are corrected, and the coded data in the second coded data line L02 is fetched from the banks 0 and 1 and is stored and assembled in the second SRAM 27. In a third cycle, the corrected coded data of the first coded data line L01 is fed back to the first SRAM 26 from the error correction circuit 29 to update the original data in the SRAM 26, the coded data of the second coded data line L02 in the SRAM 27 is sent to the error correction circuit 29 through the SRAM controller 25 and the error(s) of the data of the second coded data line L02 are corrected, and the coded data of the third coded data line L03 is fetched from the banks 0 and 1 and is assembled in the third SRAM 28.

In a fourth cycle, the corrected coded data of the first coded data line L01 in the first SRAM 26 is rewritten to the banks 0 and 1 through the SRAM controller 25 and the buffer manager 23 so that the error(s) of the data of the first coded data line L01 are corrected, the corrected coded data of the second coded data line L02 are fed back to the second SRAM 27 from the error correction circuit 29 to update the original data in the SRAM 27, and the coded data of the third coded data line L03 in the SRAM 28 is sent to the error correction circuit 29 through the SRAM controller 25 and the error(s) of the data of the third coded data line are corrected.

In a fifth cycle, the coded data of the fourth coded data line L04 is fetched from the banks 0 and 1 and is stored and assembled in the first SRAM 26, the corrected coded data of the second coded data line L02 in the second SRAM 27 is rewritten to the banks 0 and 1 through the SRAM controller 25 and the buffer manager 23 so that the error(s) of the data of the second coded data line L02 are corrected, and the corrected coded data of the third coded data line L03 is fed back to the third SRAM 28 from the error correction circuit 29 to update the original data so that the error(s) of the data of the third coded data line are corrected. In this manner, the error correction in the row direction is continuously performed until the error correction of the coded data of the last row PO16 shown in FIG. 1 has been completed.

The above-described error correction operations in the column direction and the row direction are repeated at least one time to improve the precision of the error correction. It is preferable to repeat the error correction operations in the column and row direction by any number of times if the time is available. After the error correction, the buffer manager 23 reads the corrected data in the banks 0 and 1 by using the real addresses shown in Table 1 and sends them to the personal computer 20 through the host interface 24.

While the invention has been described with respect to an illustrative embodiment thereof, it will be understood that various changes may be made in the method and means herein described without departing from the scope and teaching of the invention. Accordingly, the described embodiment is to be considered merely exemplary and the invention is not to be limited except as specified in the following claims.

What is claimed is:

1. A machine-implementable method for enhancing the data transfer rate in an arrangement formed by an ECC processor coupling a first memory, said arrangement detecting and correcting errors and erasures responsive to a source of error correction-coded (ECC) product data arrays, each product-coded array having a first predetermined number of rows of Y bytes per row and a second predetermined number of columns, said arrangement writing each data array into a first memory, transferring data from the array in the first memory to the ECC processor, transferring corrected data from the ECC processor, and writing said transferred corrected data back into the first memory, comprising the steps of:

(a) transferring each row of the data array from the source in row major order in blocks of $2^N$ bytes per block and (2 m+1) blocks per row, and writing consecutive blocks ($1^{st}$ row—$A_0$, $B_0$, $A_1$; $2^{nd}$ row—$B_1$, $A_2$, $B_2$, . . . ) into successive alternate addresses ($A_0$, $A_1$, $A_2$; $B_0$, $B_1$, $B_2$) in a pair of independently accessible linear address spaces in the first memory operated in an interleaved manner, N and m being positive integers satisfying the constraint $Y \leq 2^N \times (2\ m+1)$; and (b) extracting data, ECC correcting the extracted data, and rewriting corrected data to and from successive addresses in the linear address spaces in the first memory in block interleave array row major order and then in block interleave array column major order.

2. The method according to claim 1, wherein each data array has a row direction and a column direction, and further wherein each product data array is encoded in a first linear systematic ECC as one selected from a set consisting of a block ECC and a cyclic ECC, said first ECC being defined over the array in the row direction, and still further wherein each product data array is encoded in a second linear systematic ECC as one selected from a set consisting of a block ECC and a cyclic ECC, said second ECC being defined over the array in the column direction.

3. The method according to claim 2, wherein each data array comprises $K_1 \times K_2$ symbols formed from $K_1$ rows of ($K_2$–PI) data symbols and PI redundant symbols per row and $K_2$ columns of ($K_1$–PO) data symbols and PO redundant symbols per column, the PI redundant symbols per row being derived from the row data symbols according to the first ECC, the PO redundant symbols per column being derived from the column data symbols according to the second ECC.

4. The method according to claim 1, wherein the first memory comprises a synchronous dynamic random access memory (SDRAM) logically partitioned to form the pair of linear address spaces, and further wherein that part of step (b) of extracting array data from the linear address spaces ($A_0, A_1, A_2; B_0, B_1, B_2$) in the SDRAM in block interleave array row major order includes the substep of extracting the blocks in successive addresses in the linear spaces in an alternate and interleaved pattern ($1^{st}$ row—$A_0, B_0, A_1$; $2^{nd}$ row—$B_1, A_2, B_2, \ldots$); and still further wherein that part of step (b) of extracting array data from the linear address spaces ($A_0 A_3 A_6 A_9$; $B_1 B_4 B_7 B_{10}$) in the SDRAM in block interleave array column major order includes the substep of extracting the blocks in successive addresses in the linear spaces in an alternate and interleaved offset pattern ($1^{st}$ col.—$A_0 B_1 A_3 B_4$; $2^{nd}$ col.—$B_0 A_2 B_3 A_5, \ldots$).

5. The method according to claim 1, wherein each array row of length Y bytes includes 2 m+1 blocks of $2^N$ bytes per block subject to the constraint $Y \leq 2^N \times (2\ m+1)$, and still further wherein for a use efficiency in the range from between 80% to 100% and Y being set equal to a nominal 182 bytes, then an ordered pair (N, m) of integer parameters is one selected from a set consisting of {(3, 11), (3, 12), (4, 6), (5, 3), (6, 1)}.

6. The method according to claim 1, wherein that part of step (b) of ECC correcting the extracted data, and rewriting corrected data to and from the linear address spaces in the first memory in block interleave array row major order and then in block interleave array column major order includes the substep of writing back the corrected data in place in the linear address spaces.

7. The method according to claim 1, wherein step (b) further comprises the substeps of:

(c) applying the extracted blocks constituting at least a pair of array rows to the ECC processor in a pipelined pattern and applying the blocks constituting at least a pair of array rows of corrected data to the first memory in a pipelined pattern; and (d) applying the extracted blocks constituting at least a pair of array columns to the ECC processor in a pipelined pattern and applying the blocks constituting at least a pair of array columns of corrected data to the first memory in a pipelined pattern.

8. The method according to claim 1, wherein said source includes a storage subsystem having a cyclic, tracked medium for recording the data arrays, an accessing mechanism, the first memory, and a first processor coupling the mechanism and the first memory and responsive to extrinsic commands for causing the mechanism to read selected array data from the medium and write into first memory.

9. The method according to claim 8, wherein the medium is formed from a plurality of helical tracks of product-coded array data written onto an optically readable recording medium conforming to a digital video device (DVD) standard.

10. In a storage subsystem including a cyclic medium formed from a plurality of tracks for recording error correction-coded (ECC) product data arrays and an arrangement responsive to extrinsic commands, said arrangement having an accessing mechanism for writing each data array into a first memory from the medium, and logic circuits for transferring data from the array in the first memory to an ECC processor, transferring corrected data from the ECC processor, and writing said transferred corrected data back into the first memory, each product-coded array having a first predetermined number of rows of Y bytes per row and a second predetermined number of columns, wherein the arrangement further comprises the subsystem including:

first circuits including the accessing mechanism for transferring each row of the data array from the source in row major order in blocks of $2^N$ bytes per block and (2 m+1) blocks per row, and writing consecutive blocks ($1^{st}$ row—$A_0, B_0, A_1$; $2^{nd}$ row—$B_1, A_2, B_2, \ldots$) into successive alternate addresses ($A_0, A_1, A_2; B_0, B_1, B_2$) in a pair of independently accessible linear address spaces in the first memory operated in an interleaved manner, N and m being positive integers satisfying the constraint $Y \leq 2^N \times (2\ m+1)$; and second circuits for extracting data, ECC correcting the extracted data, and rewriting corrected data to and from successive addresses in the linear address spaces in the first memory in block interleave array row major order and then in block interleave array column major order, whereby the data transfer rate from the medium through and including the first memory is enhanced.

11. The arrangement according to claim 10, wherein each data array has a row direction and a column direction, and further wherein each product data array is encoded in a first linear systematic ECC as one selected from a set consisting of a block ECC and a cyclic ECC, said first ECC being defined over the array in the row direction, and still further wherein each product data array is encoded in a second linear systematic ECC as one selected from a set consisting of a block ECC and a cyclic ECC, said second ECC being defined over the array in the column direction.

12. The arrangement according to claim 11, wherein each data array comprises $K_1 \times K_2$ symbols formed from $K_1$ rows of ($K_2$–PI) data symbols and PI redundant symbols per row and $K_2$ columns of ($K_1$–PO) data symbols and PO redundant symbols per column, the PI redundant symbols per row being derived from the row data symbols according to the first ECC, the PO redundant symbols per column being derived from the column data symbols according to the second ECC.

13. The arrangement according to claim 10, wherein the first memory comprises a synchronous dynamic random access memory (SDRAM) logically partitioned to form the pair of linear address spaces, and further wherein that part of step (b) of extracting array data from the linear address spaces ($A_0, A_1, A_2; B_0, B_1,$ $B_2$) in the SDRAM in block interleave array row major order includes the substep of extracting the blocks in successive addresses in the linear spaces in an alternate and interleaved pattern ($1^{st}$ row—$A_0$, $B_0$, $A_1$; $2^{nd}$ row—$B_1$, $A_2$, $B_2$, . . . ); and still further wherein that part of step (b) of extracting array data from the linear address spaces ($A_0A_3A_6A_9$; $B_1B_4B_7B_{10}$) in the SDRAM in block interleave array column major order includes the substep of extracting the blocks in successive addresses in the linear spaces in an alternate and interleaved offset pattern ($1^{st}$ col.—$A_0B_1A_3B_4$; $2^{nd}$ col.—$B_0A_2B_3A_5$, . . . ).

14. The arrangement according to claim 10, wherein each array row of length Y bytes includes 2 m+1 blocks of $2^N$ bytes per block subject to the constraint $Y \leq 2^N \times (2\ m+1)$, and still further wherein for a use efficiency in the range from between 80% to 100% and Y being set equal to a nominal 182 bytes, then an ordered pair (N, m) of integer parameters is one selected from a set consisting of {(3, 11), (3, 12), (4, 6), (5, 3), (6, 1)}.

15. The arrangement according to claim 10, wherein the second circuits for ECC correcting the extracted data, and rewriting corrected data to and from the linear address spaces in the first memory in block interleave array row major order and then in block interleave array column major order include circuits for writing back the corrected data in place in the linear address spaces.

16. The subsystem according to claim 10, whereby the medium is formed from a plurality of helical tracks of product-coded array data written onto an optically readable recording medium conforming to a digital video device (DVD) standard.

17. An article of manufacture comprising a machine-readable memory having stored therein indicia of a plurality of processor-executable control program steps for enhancing the data transfer rate in an arrangement formed by an ECC processor coupling a first memory, said arrangement detecting and correcting errors and erasures responsive to a source of error correction-coded (ECC) product data arrays, each product-coded array having a first predetermined number of rows of Y bytes per row and a second predetermined number of columns, said arrangement writing each data array into a first memory, transferring data from the array in the first memory to the ECC processor, transferring corrected data from the ECC processor, and writing said transferred corrected data back into the first memory, said indicia comprising:

(a) indicia of a first control program step for transferring each row of the data array from the source in row major order in blocks of $2^N$ bytes per block and (2 m+1) blocks per row, and writing consecutive blocks ($1^{st}$ row—$A_0$, $B_0$, $A_1$; $2^{nd}$ row—$B_1$, $A_2$, $B_2$, . . . ) into successive alternate addresses ($A_0$, $A_1$, $A_2$; $B_0$, $B_1$, $B_2$) in a pair of independently accessible linear address spaces in the first memory operated in an interleaved manner, N and m being positive integers satisfying the constraint $Y \leq 2^N \times (2\ m+1)$; and (b) indicia of a second control program step for extracting data, ECC correcting the extracted data, and rewriting corrected data to and from successive addresses in the linear address spaces in the first memory in block interleave array row major order and then in block interleave array column major order.

* * * * *